United States Patent
Grehl et al.

(10) Patent No.: US 6,475,448 B2
(45) Date of Patent: Nov. 5, 2002

(54) METHOD FOR THE SEPARATION OF RUTHENIUM FROM NOBLE METAL SOLUTIONS

(75) Inventors: Matthias Grehl, Frankfurt; Horst Meyer, Altenstadt; Dieter Schäfer, Münzenberg, all of (DE)

(73) Assignee: W.C. Heraeus GmbH & CO KG, Hanau (DE)

( * ) Notice: Subject to any disclaimer, the term of this patent is extended or adjusted under 35 U.S.C. 154(b) by 80 days.

(21) Appl. No.: 09/753,291

(22) Filed: Jan. 2, 2001

(65) Prior Publication Data

US 2001/0021361 A1 Sep. 13, 2001

(30) Foreign Application Priority Data

Jan. 5, 2000 (DE) .......................... 100 00 275

(51) Int. Cl.⁷ ............................... C22B 11/00
(52) U.S. Cl. ........................................ 423/22
(58) Field of Search ............................ 423/22

(56) References Cited

U.S. PATENT DOCUMENTS

| 4,086,084 A | * | 4/1978 | Oliver et al. | ............ | 423/22 |
| 4,105,442 A | * | 8/1978 | Fieberg et al. | ............ | 423/22 |
| 4,390,366 A | | 6/1983 | Lea et al. | ............ | 75/101 |
| 5,304,359 A | * | 4/1994 | Duyvesteyn et al. | ..... | 423/22 |

FOREIGN PATENT DOCUMENTS

DE    39 35 798    5/1991

OTHER PUBLICATIONS

Berlin XP–002166005 63 (1938), pp. 27–28, No Month.

* cited by examiner

*Primary Examiner*—Steven Bos
(74) *Attorney, Agent, or Firm*—Norris McLaughlin & Marcus

(57) ABSTRACT

Ruthenium is separated from noble metal solutions, by:

a) heating a noble metal solution containing ruthenium to a temperature of $T=+50°$ C. to $T=+65°$ C., the $H^+$ concentration and $Cl^-$ concentration are greater than 1 mol/l each;

b) addition of chlorate, the resulting suspension/solution having a temperature of $T=+50°$ C. to $T=+65°$ C., heating the suspension solution to $T=+80°$ C. to $T=+90°$ C. and passing a carrier gas through the suspension/solution and capturing the resultant ruthenium tetroxide;

c) addition of bromate at a pH of 1 to 3, the resultant suspension/solution having a temperature $T=+60°$ C. to $T=+95°$ C., and passing a carrier gas through the suspension solution and capturing the resultant ruthenium tetroxide.

14 Claims, No Drawings

METHOD FOR THE SEPARATION OF RUTHENIUM FROM NOBLE METAL SOLUTIONS

The invention relates to a method for separating ruthenium from noble metal solutions.

In U.S. Pat. No. 4,390,366 a method is disclosed for the separation of ruthenium from noble metal solutions by warming the noble metal solution containing ruthenium and $H^+$ and $Cl^-$ ions and then adding chlorate, and further heating the resultant suspension/solution to 80 to 90° C. and capturing the ruthenium tetroxide that has formed.

The separation of the noble metal ruthenium from noble metal solutions can be performed by the oxidation of alkali ruthenate in aqueous solutions (see DE 39 35 798 A1), in which the oxidation is performed with ozone at pH levels above 8. alternatively, the ruthenium-containing noble metal solution can be distilled by means of sodium chlorate and/or chlorine gas.

A disadvantage in this process is the fact that, for a complete separation of ruthenium, a very great expenditure of time and energy is necessary, according to the composition of the noble metal solution.

On this account the problem arises of at least partially overcoming the above-stated disadvantages by means of a novel method. The resultant problem is especially to devise a method in which a complete separation of ruthenium from a noble metal solution can be accomplished in a very short time and therefore in a cost-effective manner.

In the method of the invention, in a first process step a noble metal solution containing ruthenium is heated to a temperature of T=50° C. to T=65° C., while its $H^+$ concentration and $Cl^-$ concentration is greater than 1 mole per liter each.

The chloride ions serve to destroy the chlorine dioxide which can form under certain circumstances and has a decidedly strong tendency to self-detonate.

Then, in a second process stage, chlorate is added to the solution conditioned in step a), and the resultant suspension/solution again has a temperature of T=50° C. to T=65° C. As a rule, during the addition or else also after the addition of chlorate, a carrier gas—air, for example—is passed through the suspension/solution and the ruthenium tetroxide that has formed—in an absorption solution for example, especially a hydrochloric acid solution—is captured, and after the addition of the chlorate the suspension/solution is heated to a temperature of T=80° C. to T=90° C.

The carrier gas serves to greatly dilute the ruthenium tetroxide which, in greater concentration, tends to detonate.

Lastly, in a third process step, bromate is added to the suspension/solution at a pH of 1 to 3, the resultant suspension/solution having a temperature of T=60° C. to T=95° C. Simultaneously, or thereafter, a carrier gas is passed through the suspension/solution and the ruthenium tetroxide that forms is captured, for example, in an absorption solution, especially a HCl solution.

The pH range of 1 to 3 is important for this last process step, since in this range the ruthenium can very easily be oxidized to ruthenium tetroxide.

First it is advantageous, as it has been proven, if the ruthenium tetroxide is captured in an absorption solution, for example in an HCl solution.

If, when the chlorate is added, an equimolecular chlorate is added to the solution, this is advantageous, since at least in this way the minimum amount is provided for a virtually complete reaction.

It is furthermore advantageous that hydrochloric acid is used as an absorption solution, since solid ruthenium chloride and ruthenium metal can be produced relatively easily from this solution. Advantageously, chlorate in the form of a sodium chlorate solution has proven good for addition to the corresponding solution.

Especially it is advantageous if a 4.5 molar sodium chlorate solution is added, since when chlorate is added as oxidant, due to this highly concentrated solution, the increase in the volume of the reaction solution is relatively slight.

Furthermore it is advantageous to add the bromate in the form of a sodium bromate solution to the solution, especially if this sodium bromate solution is 1.5 to 2 molar, since the increase in the volume of the reaction solution remains slight.

To a special degree it has proven especially advantageous in practice if before the addition of bromate (i.e., in the first process step) is heated to a temperature of T=65° C., since the oxidation of the ruthenium to ruthenium tetroxide takes place relatively rapidly, but the self-degradation of the oxidant takes place still relatively slowly.

It is furthermore advantageous if the solution is free of organic compounds before the addition of chlorate (i.e., in the first process step) since thus no uncontrolled oxidation reactions can occur and lead, under certain circumstances, to an explosion.

In this connection it is furthermore advantageous if the rate of addition of the chlorate solution is adapted to the progress of the reaction, so as to prevent excesses of chlorate and thus to prevent a violent reaction.

It is advantageous if, after the addition of bromate and the reaction are finished an $H^+$ concentration of $c>1$ mol/l is established in order thus to dissolve any metal hydroxides that have formed in any way, which otherwise would interfere with the further processing of the now ruthenium-free solution.

In an advantageous manner, after the adjustment chlorine gas is introduced into the solution in order to remove bromide and bromine from the now ruthenium-free solution. If desired in this case it can be strongly acidified again with HCl.

Lastly it is advantageous to use compressed air simultaneously with the introduction of chlorine, since this provides a mechanical support and thus a more intimate gassing of the solution with chlorine, and the bromine that simultaneously forms is driven out of the solution.

The following example will serve to explain the invention.

Laboratory Apparatus

The distillation apparatus consisted of a one-liter four-necked flask with thermometer, gas introducing tube, dropping funnel and gas exhaust. The gas exhaust led to 3 gas washing bottles. The first two washing bottles were filled each with about 150 ml of concentrated HCl and the third washing bottle was filled with about 150 ml of water. To the last gas washing bottle a vacuum pump was attached, through which about 100 liters per hour was drawn through the distillation apparatus during the distillation. The four-necked flask was heated with a heating hood and the solution was stirred by a magnetic stirrer under the heating hood.

Conduct of the experiment

Input: 300 ml noble metal solution containing ruthenium—$c(H^+)=5.4$ mol/l 300 ml of solution containing ruthenium was placed in the distillation apparatus and heated. In the temperature range from 70° C. to 76° C., 120 ml of 4.5-molar sodium chlorate solution was metered in within 1.5 hours. The pH value after that was 1.63 at T=76° C.

Then the solution was heated to about 85° C., washing bottle 1 was filled with fresh HCl and 25 ml of 1.25 molar sodium bromate solution was added. After 2.5 hours a pH of 2.66 was measured at T=84° C.

Then, at 85° C. to 90° C., 2 to 3 ml of concentrated HCl and about 4 to 6 ml of sodium bromate solution was added. This procedure was repeated until the first washing bottle, which was regularly filled with fresh concentrated HCl, changed color but weakly. Then a total of 64 ml of concentrated HCl and 1.25 molar sodium bromate solution were consumed for that purpose within 10 hours.

The solution was then cooled.

To destroy excess sodium chlorate and sodium bromate, 150 ml of concentrated HCl was added to the filtrate and the solution of about 850 ml was concentrated to 630 ml.

A sample of this solution was analyzed by DCP.

Evaluation

| | Analysis Results | | | Balancing | |
|---|---|---|---|---|---|
| Sample | Beginning | After distillation | Sample | Beginning | After distillation |
| Volume | 0.3 liter | 0.63 liter | | Absolute input | Amount with respect to input |
| Ru | 10.07 g/l | 0.006 g/l | Ru | 3.02 g | 0.13% |
| Ir | 0.30 g/l | 0.145 g/l | Ir | 0.09 g | ~100% |

99.97% of the ruthenium were separated from the iridium by the process.

What is claimed is:

1. Method for the separation of ruthenium from noble metal solutions containing ruthenium and $H^+$ and $Cl^-$ ions, wherein in a first step the ruthenium-containing noble metal solution having an $H^+$ concentration and $Cl^{31}$ concentration of greater than 1 mol/l is heated to 50 to 65° C., then in a second step chlorate is added to the heated noble metal solution to form a suspension/solution, the suspension/solution is heated to 80 to 90° C., a carrier gas is passed through the heated suspension/solution to capture ruthenium tetroxide, and, in a third step, bromate is added to the heated suspension/solution at a pH of 1 to 3 and a temperature of 60 to 95° C., and a carrier gas is passed through the bromated suspension/solution to capture additional ruthenium tetroxide.

2. Method according to claim 1, wherein the ruthenium tetroxide is captured by absorption in an absorption solution.

3. Method according to 1 wherein in the second step an equimolecular amount of chlorate is added to the solution.

4. Method according to claim 1, wherein said absorption solution is hydrochloric acid.

5. Method according to claim 1, wherein said chlorate is added in the form of a sodium chlorate solution.

6. Method according to claim 1, wherein said sodium chlorate solution is a 4.5 molar sodium chlorate solution.

7. Method according to claim 1, wherein said bromate is added in the form of a sodium bromate solution.

8. Method according to claim 7, wherein said the sodium bromate solution is a 1.5–2 molar sodium bromate solution.

9. Method according to claim 1, wherein the solution is heated in said first step to a temperature of 65° C.

10. Method according to claim 1, wherein the solution in the first step is free of organic compounds.

11. Method according to claim 1, wherein the rate of addition of the chlorate is adapted the rate at which chlorate is consumed to prevent the accumulation of excess chlorarte in the heated noble metal solution.

12. Method according to claim 1, wherein, after the completion of the bromate addition the $H^+$ concentration of the suspension/solution is adjusted to a concentration of greater than 1 mol/l.

13. Method according to claim 12, wherein after the $H^+$ concentration is adjusted, chlorine gas is introduced into the bromated suspension/solution.

14. Method according to claim 13, wherein compressed air is introduced simultaneously during the introduction of the chlorine gas.

* * * * *